(12) United States Patent
Branham et al.

(10) Patent No.: US 10,748,196 B2
(45) Date of Patent: Aug. 18, 2020

(54) SYSTEM AND METHOD FOR FRESH ONLINE EXPERIENCE

(71) Applicant: Walmart Apollo, LLC, Bentonville, AR (US)

(72) Inventors: Shawn Branham, Bentonville, AR (US); William Ross Allen, Pea Ridge, AR (US); Richard M. Blair, II, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 365 days.

(21) Appl. No.: 15/628,757

(22) Filed: Jun. 21, 2017

(65) Prior Publication Data

US 2017/0372388 A1 Dec. 28, 2017

Related U.S. Application Data

(60) Provisional application No. 62/353,610, filed on Jun. 23, 2016.

(51) Int. Cl.
*G06Q 30/00* (2012.01)
*G06Q 30/06* (2012.01)

(52) U.S. Cl.
CPC ..... *G06Q 30/0603* (2013.01); *G06Q 30/0627* (2013.01); *G06Q 30/0633* (2013.01); *G06Q 30/0643* (2013.01)

(58) Field of Classification Search
CPC .............. G06Q 30/00; G06Q 30/0601; G06Q 30/0603; G06Q 30/0627; G06Q 30/0633; G06Q 30/0643
See application file for complete search history.

(56) References Cited

U.S. PATENT DOCUMENTS

| | | | |
|---|---|---|---|
| 5,832,212 A | * | 11/1998 | Cragun ............... G06F 21/6218 726/2 |
| 6,336,099 B1 | * | 1/2002 | Barnett ............... G06Q 20/108 705/14.35 |
| 7,290,707 B2 | | 11/2007 | Sawasaki |
| 7,685,023 B1 | | 3/2010 | Abraham et al. |
| 8,359,642 B1 | * | 1/2013 | Wurtenberger ....... H04L 63/102 726/7 |

(Continued)

FOREIGN PATENT DOCUMENTS

WO 2014055079 4/2014

OTHER PUBLICATIONS

Rateni, Giovanni, Paolo Dario, and Filippo Cavallo. "Snnartphone-based food diagnostic technologies: A review." Sensors 17.6 (2017): 1453. (Year: 2017).*

(Continued)

*Primary Examiner* — Christopher B Seibert
(74) *Attorney, Agent, or Firm* — Schmeiser, Olsen & Watts LLP; Lori F. Cuomo (57) ABSTRACT

Disclosed is a system and method for visually verifying the exact item a customer will be receiving through the online grocery pick up of a retail store. The system allows for customers to order a fresh item, such as apples, and view images of the exact fresh item online before finalizing purchase for retail store pickup. The exact fresh item is scanned using three dimensional scanning. The customer views the images and approves or rejects the exact fresh item before finalizing purchase.

16 Claims, 4 Drawing Sheets

(56) References Cited

U.S. PATENT DOCUMENTS

| | | | |
|---|---|---|---|
| 2002/0116295 A1 | 8/2002 | Shino et al. | |
| 2004/0068443 A1* | 4/2004 | Hopson | G06Q 10/02 705/5 |
| 2004/0117384 A1* | 6/2004 | Ray | G06Q 20/04 |
| 2006/0259369 A1 | 11/2006 | Bongrazio et al. | |
| 2007/0136146 A1 | 6/2007 | Hopson et al. | |
| 2007/0256093 A1* | 11/2007 | Hiler | G06Q 30/02 725/28 |
| 2008/0155614 A1* | 6/2008 | Cooper | G06F 21/10 725/91 |
| 2008/0162305 A1 | 7/2008 | Rousso et al. | |
| 2008/0195507 A1 | 8/2008 | Ratnakar | |
| 2009/0240518 A1* | 9/2009 | Borom | G06Q 30/02 705/14.1 |
| 2010/0010902 A1 | 1/2010 | Casey | |
| 2010/0094457 A1 | 4/2010 | Garson et al. | |
| 2011/0055046 A1* | 3/2011 | Bowen | G06Q 10/08 705/26.41 |
| 2011/0153512 A1* | 6/2011 | Peckover | G06F 21/10 705/318 |
| 2012/0006891 A1* | 1/2012 | Zhou | G06Q 20/3274 235/380 |
| 2012/0166268 A1 | 6/2012 | Griffiths | |
| 2013/0110666 A1 | 5/2013 | Aubrey | |
| 2013/0191173 A1* | 7/2013 | Shobola | G06Q 20/322 705/5 |
| 2014/0089077 A1* | 3/2014 | Zuckerman | G07F 17/0064 705/14.37 |
| 2014/0337764 A1 | 11/2014 | Caraballoso et al. | |
| 2015/0029339 A1* | 1/2015 | Kobres | H04N 7/181 348/150 |
| 2015/0109451 A1 | 4/2015 | Dhankhar | |
| 2016/0063604 A1* | 3/2016 | Shaffer | G06F 16/29 |

OTHER PUBLICATIONS

International Preliminary Report on Patentability in PCT/US2017/038428 dated Jan. 3, 2019; 7 pages.

Prigg, Mark "Online shopping goes virtual with a perfect recreation of a supermarket (and you never need to leave the sofa to walk through it)," DailyMail.co.uk, Sep. 19, 2012; 5 pages.

Office Action in Canadian Patent Application No. 3,019,686 dated Aug. 27, 2019; 4 pages.

International Search Report & Written Opinion in International Patent Application No. PCT/US17/38428, dated Jun. 21, 2017; 8 pages.

* cited by examiner

SYSTEM AND METHOD FOR FRESH ONLINE EXPERIENCE

RELATED APPLICATION

This application claims priority to U.S. Provisional Patent Application Ser. No. 62/353,610, filed Jun. 23, 2016 and entitled "SYSTEM AND METHOD FOR FRESH ONLINE EXPERIENCE", which is hereby incorporated entirely herein by reference.

FIELD OF THE INVENTION

The invention relates generally to ordering fresh items online, and particularly to a system and method for ordering fresh items online using exact images of the fresh item.

BACKGROUND

A customer when visiting a retail store can inspect and choose produce that seems to look like the highest quality. However, a customer who orders the same item from a retail store website for grocery pickup and/or delivery has to rely on the store associate to choose the actual item to be delivered. They may be dissatisfied with that result.

It is desirable for the customer to be able to request images of the item in the retail store, so that the customer can be satisfied with their online purchase.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Disclosed herein is a system and method for ordering fresh items online for store pick up comprising an internet customer interface wherein a customer selects a fresh item type based on a stock image and/or description; a scanning module comprising a scanner, wherein the scanner is used by a store associate to scan a first fresh item for purchase; a store associate interface connected to the scanning module to allow a store associate to view and post a scan of the first actual fresh item; a communications module to send notification to the customer to approve or reject the scan of the first actual fresh item; a timing function connected to the communications module wherein the customer is allowed a fixed amount of time in which to approve or reject the scan of the first actual fresh item; and wherein if the scan of the first fresh item is not approved or if the scan of the first fresh item is rejected, the communications module will notify the store associate to scan an additional fresh item, an edible watermark application module, wherein an edible watermark is applied to the first actual fresh item and/or the additional actual fresh item prior to the scan; and a limiting function connected to the communication module wherein the customer is allowed a fixed number of attempts to approve the scan of the additional fresh item, wherein once the system receives approval of the scan of either the first fresh item or the additional fresh item, the store associate finalizes the order and the pickup of the fresh item that corresponds with the approved scan of either the first fresh item or the additional fresh item.

The internet customer interface can be a mobile application. The internet customer interface can be a web browser. The scanner can use two dimensional imaging or three dimensional imaging. The first actual fresh item and/or the additional actual fresh item may be retrieved to scan via a item hopper. The first actual fresh item and/or the additional actual fresh item may be retrieved to scan via a vending machine.

Disclosed herein is also a method for ordering at least one actual fresh item online for store pick up comprising selecting by a customer through an internet customer interface a fresh item type based on a stock image and/or description; scanning by a store associate a first actual fresh item for purchase; viewing and posting by the store associate through a store associate interface a scan of the first actual fresh item; sending notification through a communications module to the customer to approve or reject the scan of the first actual fresh item; wherein the customer is allowed a fixed amount of time in which to approve or reject the scan of the first actual fresh item; wherein if the scan of the first actual fresh item is not approved or if the scan of the first actual fresh item is rejected, the communications module will notify the store associate to scan an additional actual fresh item; wherein the customer is allowed a fixed number of attempts to approve the scan of the additional actual fresh item; applying an edible watermark to the first actual fresh item and/or the additional actual fresh item prior to the scan; and finalizing the order and the pickup of the actual fresh item that corresponds with the approved scan of either the first actual fresh item or the additional actual fresh item once the system receives approval of the scan of either the first actual fresh item or the additional actual fresh item.

More than one fresh item type may be selected. Once the system receives approval of the scan of either the first actual fresh item or the additional actual fresh item of each of the selected fresh item types, the store associate finalizes the order and the pickup of the actual fresh items that correspond with the approved scans of either the first actual fresh item or the additional actual fresh item. The internet customer interface can be a mobile application. The internet customer interface can be a web browser. The scanning can use two dimensional or three dimensional imaging. The first actual fresh item and/or the additional actual fresh item may be retrieved to scan via an item hopper.

The Fresh Online Experience (FOE) system and method according to the invention may facilitate customers' ability to visually verify the exact fresh item they will be receiving through a retail store.com grocery pickup, for example. The system may include a customer opt-in for the FOE system through a customer interface accessible through several web client platforms including, but not limited to, mobile applications and web browsers. By opt-in, it is understood that not every purchase will follow this FOE system by default. As part of the customer interface, the system may allow for items to be selected for visual verification through exact images of the fresh item selected for purchase instead of stock images before fulfilling the order.

In one embodiment the system is automated. The system may include a scanning module, such as a two dimensional scanning device or a three dimensional scanning device, in order to scan fresh items. This scanning module may be coupled to the store associate interface module to allow the store associate to view and process the scans, if the need arises. The system then retrieves the selected (ordered) fresh item(s) via item hoppers or item vending devices, scans the fresh item(s), and attaches images of the fresh item(s) to the customer's order. The system will then send notification(s) to the customer that they need to confirm the images.

The FOE system may include a mechanism for handling non-confirmed images by using a timer function so that the customer cannot wait until the last minute to approve. The system provides the capability through the customer interface for customers to view images and approve or reject. When fresh item images are rejected, the system will provide a different scanned image for the customer to choose from. The system will then replace rejected fresh item(s) and repeat the cycle again. Once the system has received all confirmations or the timer runs out the system will finalize preparing the order for pickup. The system will also provide a limiting function which will limit customers to a fixed number of attempts to visually verify and confirm a fresh item. When the limit is reached, the system will notify the customer and present the list of images for the customer to pick one of the images on the list to confirm. The system also allows for removing rejected fresh item(s) from the order.

In another embodiment, the system is manual. The system will alert a store associate preparing an order for fresh item(s) on the order details through a store associate interface. The store associate interface may include a print out, a screen on a mobile computing device, desktop computer screen. The system may include a two dimensional (2D) or a three dimensional (3D) scanning device which the store associate may use to scan the fresh item(s). The scanner may be connected to the store associate interface to allow the store associate to view and process the scans. The cans of the fresh item(s) are sent to a communications module where the images of the fresh item(s) are attached to the customer's order. The communications module then sends notifications to the customer that they need to confirm each of the fresh item(s) selected. The non-confirmed images are subject to a timer function so that the customer cannot wait until the last minute to confirm or reject. The system provides the capability through the customer interface for customers to view images and approve or reject the images of the fresh item(s). When fresh item images are rejected, the system will notify the store associate via the store associate interface. The store associate will then replace bad items and repeat the cycle again using the system. Once the system has received all confirmations or the timer runs out the associate will finalize preparing the order for pickup. The system will also provide a limiting function which will limit customers to a fixed number of attempts to visually verify and confirm a item. When the limit is reached, the system will notify the customer and present the list of images for the customer to pick one out of the list to confirm. The system will also allow for removing the item from the order.

While the system and method for ordering items online is intended for fresh items, including, but not limited to produce, meat and baked goods, it may be used for ordering any items, particularly non-uniform items.

Figure 1:
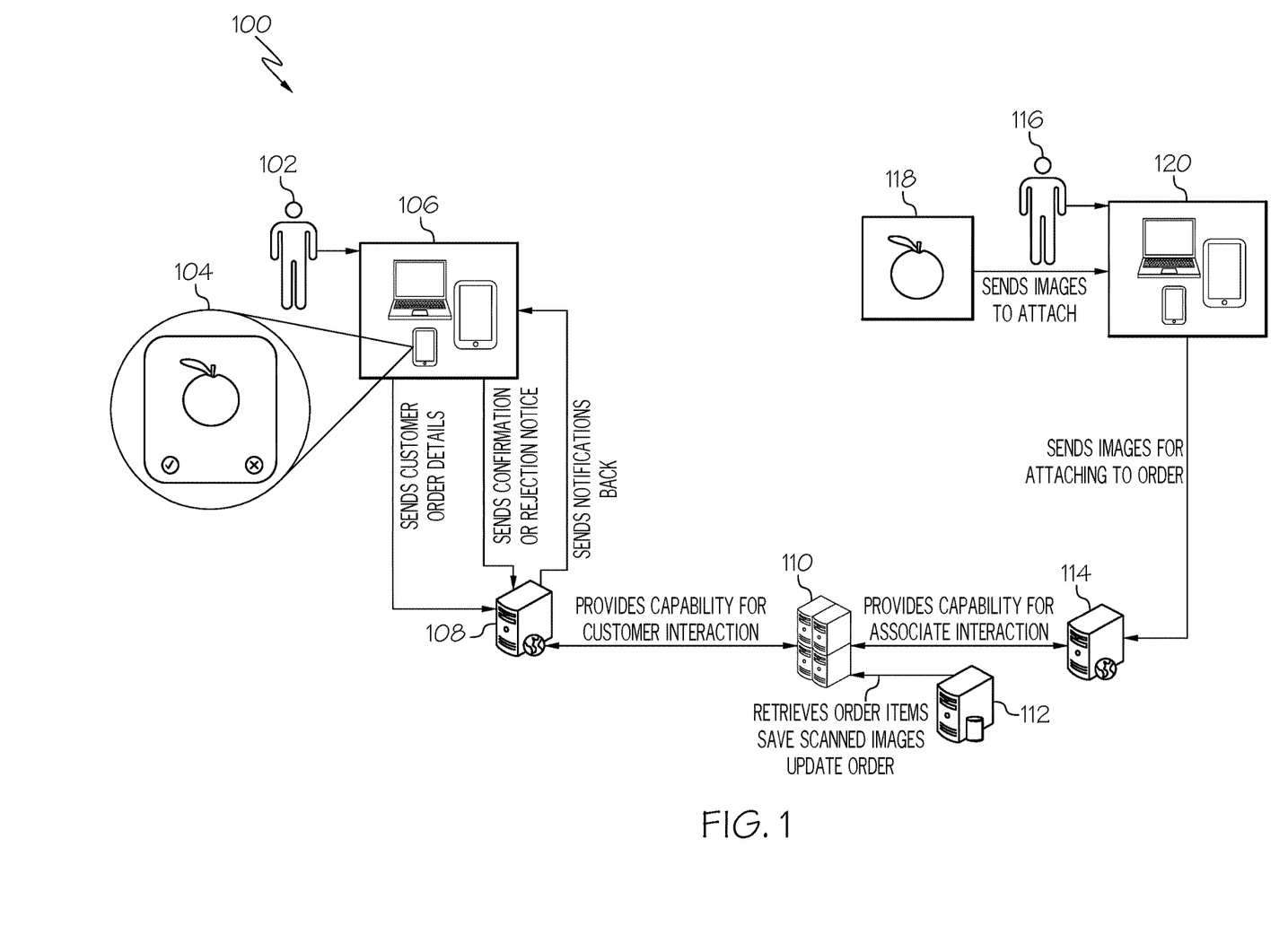
FIG. 1 illustrates a block diagram of an embodiment of a fresh online experience system according to the invention.

In FIG. 1, customer 102 orders actual fresh item(s) via image 104, such as apples, online through a customer computing device 106 interfacing with customer interface module 108. Customer interface module 108 includes a client server distributed application communicating over a network. Customer interface module 108 captures order information from customer computing device 106 and displays notification from communications module 110 and allows for viewing an entire image of fresh item 104 and may include an entire rotation of fresh item 104. Further, customer interface module 108 allows for confirming and rejecting of fresh item 104. The customer computing device 106 sends customer order details and confirmation or rejection notice to customer interface module 108 and customer interface module 108 sends notification back.

Customer interface module 108 is coupled to communications module 110 to provide customer 102 interaction with communications module 110. Communications module 110 includes a timing function and limiting function. Communications module 110 is coupled to store associate interface module 114 to provide for store associate 116 interaction with store associate user interface 114. Communications module 110 couples to order data storage module 112 to retrieve fresh item(s), save scanned item image(s) and update order.

Store associate 116 scans actual fresh item(s) 118 and processes an order from customer computing device 106 and prepares the order for pickup. Store associate 116 scans using scanning module 118. Scanning module 118 allows 2D and/or 3D images capture of actual fresh item(s) 118 and sends images to store associate computing device 120 for attaching to a customer order. Store associate computing device 120 sends images to store associate interface module 114 to attach to the order.

Customer computing device 106 can be one of many different types of devices suited for customer 102 to communicate with customer interface module 108. Mobile computing devices, for example cell phones, tablets, or smart phones, as well as desktop computing devices, with the ability to communicate and/or receive images or other data through a customer interface portal may be used by the customer.

Store associate computing device 120 can be one of many different types of devices suited for store associate 116 to communicate with store associate interface module 114 and scanning module 118. Mobile computing devices, for example cell phones, tablets, or smart phones, as well as desktop computing devices, with the ability to communicate and receive images or other data through a store associate interface portal be used by the store associate FIG. 2 illustrates a method 200 of ordering at least one fresh item online for store pickup. A customer begins at element 210 and browses online inventory 212 and creates an order for store pickup 214. The customer selects (orders) at least one fresh item including, but not limited to, produce, meat and/or bakery goods for visual pickup 216 and places an order 218 for at least one fresh item through a customer interface on, for example a mobile device. The system captures order 220 and flags the at least one fresh item for visual confirmation 222. Order preparation may include a hopper and/or a vending system to locate the at least one fresh item for confirmation 224 and dispenses the at least one fresh item to scanner 226. The scanner scans the at least one fresh item using 2D or 3D imaging 228 and sends images 230. The system attaches images to order 232. If the image is the only or last fresh item 234, the system sends a notification and starts timer 236. The customer receives notification that the images are ready 238 and views images 240 through customer interface portal.

Figure 2A:
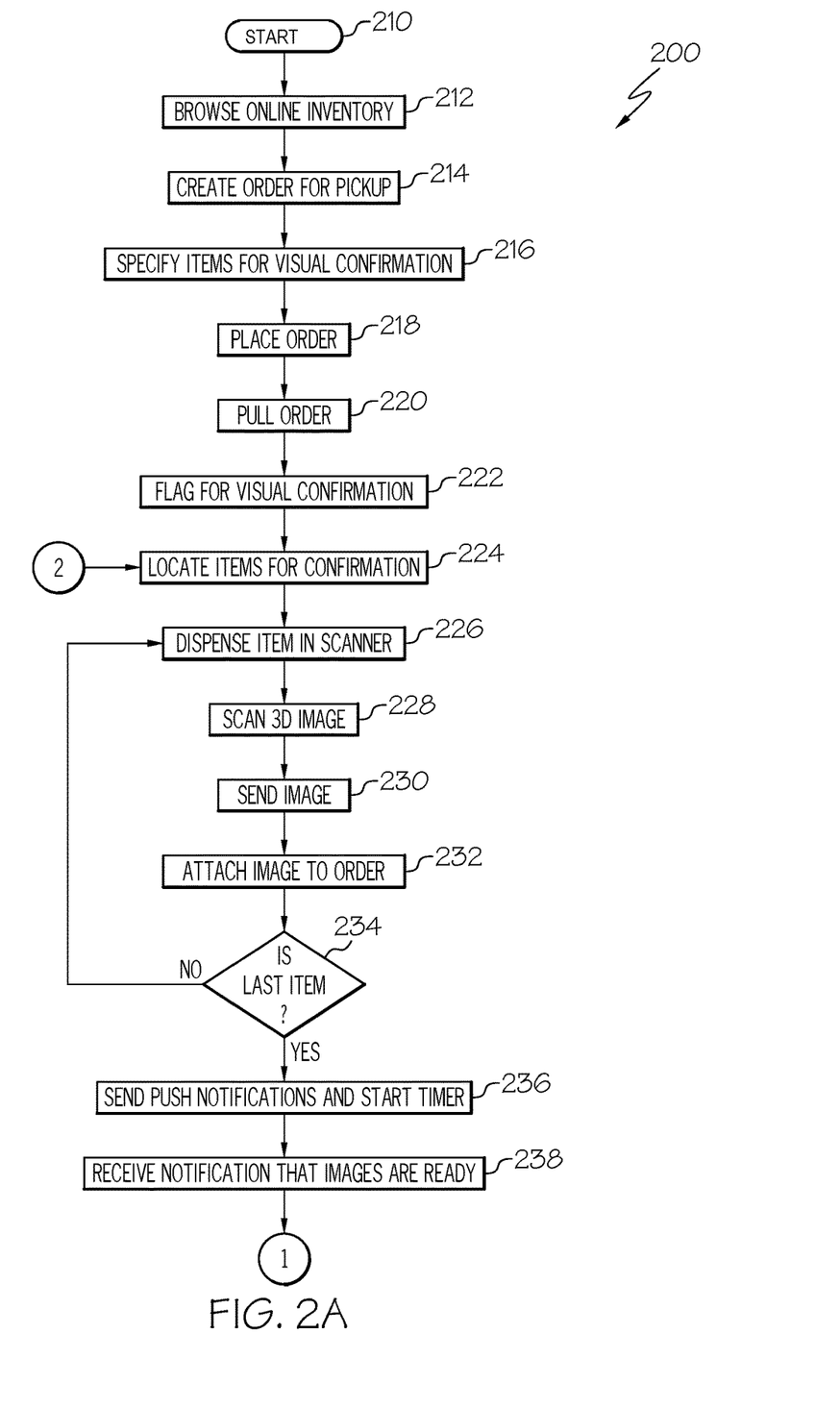
FIGS. 2A and 2B illustrate a flow diagram of an embodiment of a fresh online experience method according to the invention.
Figure 2B:
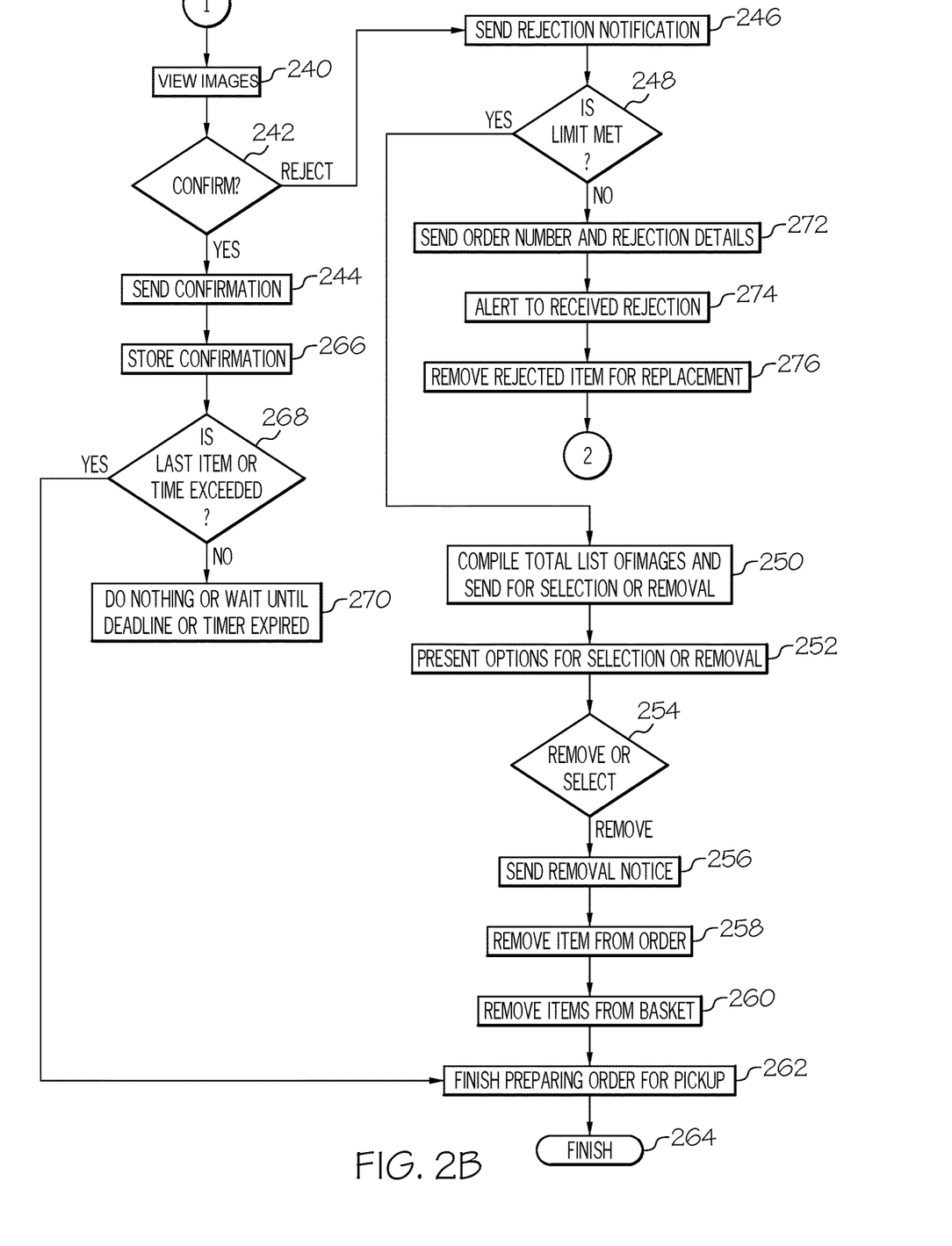

If the images are not of the only or last ordered fresh item, the system dispenses another ordered fresh item to the scanner 226. Customer confirms images 242 and sends confirmation 244 to the system. If customer does not confirm and rejects, a rejection notification is sent 246 and limit function 248 determines if a set limit of viewed images is met. If yes, total list of images is compiled and sent for selection or removal 250 to customer interface portal where options for selection or removal are shown 252. Customer removes or selects 254 and if removes, sends removal notification 256 to system where fresh item(s) are removed from online order 258 and fresh items are removed from physical order by store associate 260 and store associate finishes preparing order for pickup 262 and stops 264.

If the limit function 248 determines the set limit of viewed images is not met, order and rejection details are sent 272 and an alert to received rejection 274 and rejected fresh item(s) is removed for replacement 276 and hopper and/or vending system locates another fresh item 224.

The sent confirmation 244 is stored 266 and if the image is of the only or last fresh item selected or the time exceeded 268, store associate finishes preparing order for pickup 262 and stops at element 264. If image is not of the only or last fresh item selected or the time is not exceeded 268, store associate does nothing and/or waits until deadline or time expired 270.

The use of 2D and 3D imaging devices and distributed software systems allow for extending the physical shopping experience to a remote digital format. The system and method for ordering at least one actual fresh item online allows for customers to feel like they are able to pick the best item just like they can in a retail store. Additionally, the automated system may streamline the online order process through less manual labor.

Figure 3:
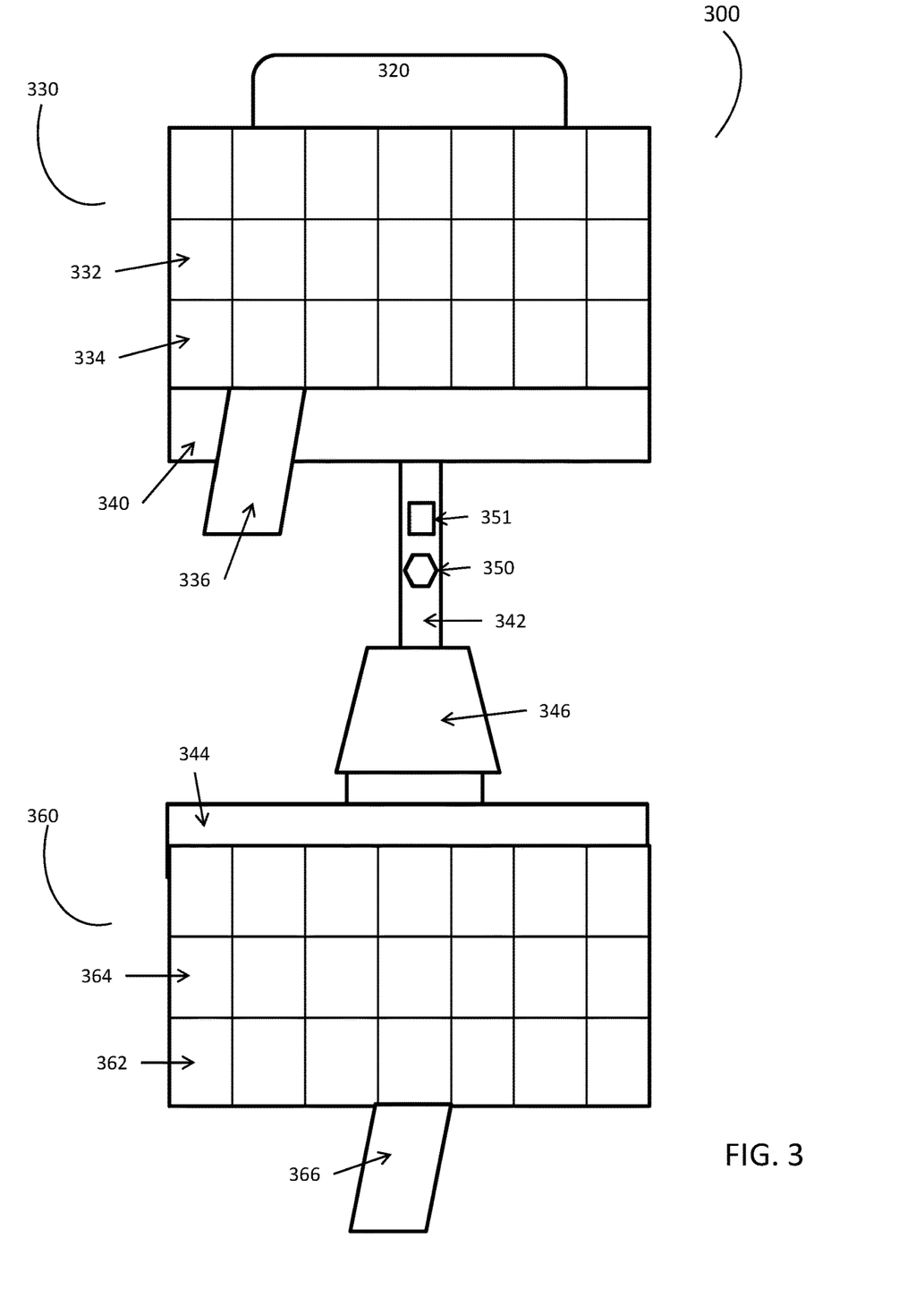
FIG. 3 illustrates a hopper/vending machine apparatus according to the invention.

The hopper and/or vending system 300 as shown in FIG. 3 may include a collection bin for order fulfillment 320 coupled to a storage bin array 330 that may be filled with fresh items. Each individual storage bin 332 may contain one item only, i.e. one banana, but several individual storage bins 332 may contain the same type of item. For example, a first column of individual storage bins 332 may contain individual bananas, and a second column of individual storage bins 332 may contain individual oranges. The storage bin array 330 may be equipped with walls 334 that can move vertically to lock a fresh item into place. The storage bin array 330 may also include a disc array angled to allow fresh items to slide into place.

Conveyer type belts 340, 342 and 344 with funnel attachment 346 may be included to move fresh items from one end of the hopper and/or vending system 300 to the other end of the hopper and/or vending system 300 and through a scanner 350 after an order is placed by a customer. Once the fresh item is scanned in scanner 350, each fresh item may be stored individually in a fulfillment bin array 360 designed to hold one fresh item at a time in individual fulfillment bins 362 while awaiting customer confirmation. The fulfillment bin array 360 may also be equipped with walls 364 that can move vertically to lock a fresh item into place. The fulfillment bin array 360 may also include a disc array angled to allow fresh items to slide into place.

Edible watermark apparatus 351, may apply an edible watermark to a fresh item prior to being scanned so as to better track the fresh item later. These edible watermarks may be made from edible ink, for example a mixture comprising food coloring. Edible watermark apparatus 351 may include print nozzles with edible ink to be printed/applied to the fresh item. The edible watermark may be applied by any method. In one embodiment, the edible watermark may be preprinted on an edible film sticker and applied to the fresh item, particularly an odd and/or irregularly shaped item In another embodiment, the edible watermark may be directly printed on the fresh item, for example on the smooth side of a banana.

Both the individual fulfillment bins 362 and the individual storage bins 332 may be equipped with a trap door on a bottom surface 366 and 336 so that when an order comes in for a fresh item, the fresh item to be scanned may be automatically placed on the conveyer type belts 340 and 342 that lead to the scanner 350 and/or when an fresh item is confirmed by the customer, the fresh item may be released into a container/basket for fulfilling the order with no store associate intervention.

For example, the hopper/vending system 300 receives an order for bananas. One of the individual storage bins 332 that contains a banana would release the trap door 336. The banana would slide onto the conveyor type belts 340 and 342 and move through the scanner 350 and into position in the fulfillment bin array 360. Customer confirmation would trigger the trap door 366 to open and the fresh item would be released into a collection container/basket that a store associate may take to the customer upon pickup. If the customer rejects the fresh item, then that fresh item would remain in place in the order fulfillment bin, and would be the first selection for the next order. Also, on rejection, the process would trigger again from the start using the previous scan.

As will be appreciated by one skilled in the art, aspects of the disclosed fresh online experience system may be embodied as an electronic system, a method, or a computer program item. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program item embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing.

Computer program code for carrying out operations for aspects of the invention may be written in any combination of one or more programming languages, including an object oriented programming language or conventional procedural programming languages, such as the "C" programming language or similar programming languages. The program code may execute entirely on the retail store's computer, partly on the store's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program items according to embodiments of the invention. It will be understood that each block of the flowchart illustrations and/or block diagrams, and combinations of blocks in the flowchart illustrations and/or block diagrams, can be implemented by computer program instructions or hardware accelerators or application specific integrated circuits.

While the invention has been shown and described with reference to specific preferred embodiments, it should be understood by those skilled in the art that various changes in form and detail may be made therein without departing from the spirit and scope of the invention as defined by the following claims.

What is claimed is:

1. A system for ordering at least one actual fresh item online for store pick up comprising:
   an internet customer interface wherein a customer selects a fresh item type based on a stock image and/or description;
   a scanning module comprising a scanner, wherein the scanner is used by a store associate to scan a first actual fresh item for purchase, and wherein the scanner uses three dimensional imaging;
   a store associate interface connected to the scanning module to allow a store associate to view and post a scan of the first actual fresh item;
   a communications module to send notification to the customer to approve or reject the scan of the first actual fresh item;
   a timing function connected to the communications module wherein the customer is allowed a fixed amount of time in which to approve or reject the scan of the first actual fresh item;
   wherein if the scan of the first actual fresh item is not approved or if the scan of the first actual fresh item is rejected, the communications module will notify the store associate to scan an additional actual fresh item,
   an edible watermark application module, wherein an edible watermark is applied to the first actual fresh item and/or the additional actual fresh item prior to the scan; and
   a limiting function connected to the communication module wherein the customer is allowed a fixed number of attempts to approve the scan of the additional actual fresh item,
   wherein once the system receives approval of the scan of either the first actual fresh item or the additional actual fresh item, the store associate finalizes the order and the pickup of the fresh item that corresponds with the approved scan of either the first actual fresh item or the additional actual fresh item.

2. The system of claim 1, wherein the customer selects more than one fresh item type.

3. The system of claim 2, wherein once the system receives approval of the scan of either the first actual fresh item or the additional actual fresh item of each of the selected fresh item types, the store associate finalizes the order and the pickup of the actual fresh items that correspond with the approved scans of either the first actual fresh item or the additional actual fresh item.

4. The system of claim 1, wherein the internet customer interface is a mobile application.

5. The system of claim 1, wherein the internet customer interface is a web browser.

6. The system of claim 1, wherein the first actual fresh item and/or the additional actual fresh item is retrieved to scan via an item hopper.

7. The system of claim 1, wherein the first actual fresh item and/or the additional actual fresh item is retrieved to scan via a vending machine.

8. The system of claim 1, wherein the actual fresh item is produce.

9. A method for ordering at least one actual fresh item online for store pick up comprising:
   selecting by a customer through an internet customer interface a fresh item type based on a stock image and/or description;
   scanning by a store associate a first actual fresh item for purchase, wherein the scanning uses three dimensional imaging;
   viewing and posting by the store associate through a store associate interface a scan of the first actual fresh item;
   sending notification through a communications module to the customer to approve or reject the scan of the first actual fresh item;
   wherein the customer is allowed a fixed amount of time in which to approve or reject the scan of the first actual fresh item;
   wherein if the scan of the first actual fresh item is not approved or if the scan of the first actual fresh item is rejected, the communications module will notify the store associate to scan an additional actual fresh item;
   wherein the customer is allowed a fixed number of attempts to approve the scan of the additional actual fresh item;
   applying an edible watermark to the first actual fresh item and/or the additional actual fresh item prior to the scan; and
   finalizing the order and the pickup of the actual fresh item that corresponds with the approved scan of either the first actual fresh item or the additional actual fresh item once the system receives approval of the scan of either the first actual fresh item or the additional actual fresh item.

10. The method of claim 9, further comprising selecting more than one fresh item type.

11. The method of claim 10, wherein once the system receives approval of the scan of either the first actual fresh item or the additional actual fresh item of each of the selected fresh item types, the store associate finalizes the order and the pickup of the actual fresh items that correspond with the approved scans of either the first actual fresh item or the additional actual fresh item.

12. The method of claim 9, wherein the internet customer interface is a mobile application.

13. The method of claim 9, wherein the internet customer interface is a web browser.

14. The method of claim 9, wherein the first actual fresh item and/or the additional actual fresh item is retrieved to scan via a item hopper.

15. The method of claim 9, wherein the first fresh actual item and/or the additional actual fresh item is retrieved to scan via a vending machine.

16. The method of claim 9, wherein the actual fresh item is produce.

\* \* \* \* \*